(12) United States Patent
Griffin et al.

(10) Patent No.: US 7,940,676 B2
(45) Date of Patent: May 10, 2011

(54) METHODS AND SYSTEMS FOR PROVIDING END-TO-END TESTING OF AN IP-ENABLED NETWORK

(75) Inventors: Lianne H. Griffin, Atlanta, GA (US); Randy S. Young, Lawrenceville, GA (US); Jeffrey Neumann, Atlanta, GA (US); Bryn S. Henderson, Snellville, GA (US); Scott K. Sheppard, Decatur, GA (US); Earl C. Meggison, Jr., Lilburn, GA (US); Donald M. Kemp, Atlanta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 987 days.

(21) Appl. No.: 11/301,747

(22) Filed: Dec. 13, 2005

(65) Prior Publication Data
US 2006/0227714 A1    Oct. 12, 2006

Related U.S. Application Data

(60) Provisional application No. 60/670,509, filed on Apr. 12, 2005.

(51) Int. Cl.
*H04J 1/16*    (2006.01)

(52) U.S. Cl. ........ 370/242; 370/252; 370/352; 370/357; 370/469; 709/223; 709/224

(58) Field of Classification Search .................. 370/241, 370/242, 243, 244, 245, 246, 252, 253; 709/223, 709/224; 379/15.01; 714/15
See application file for complete search history.

(56) References Cited

U.S. PATENT DOCUMENTS

| | | | | |
|---|---|---|---|---|
| 5,850,388 A | * | 12/1998 | Anderson et al. | 370/252 |
| 6,754,730 B2 | * | 6/2004 | Kuan et al. | 710/15 |
| 6,819,655 B1 | * | 11/2004 | Gregson | 370/242 |
| 6,889,339 B1 | * | 5/2005 | D'Amico et al. | 714/4 |
| 2003/0202570 A1 | * | 10/2003 | Bella et al. | 375/222 |

* cited by examiner

*Primary Examiner* — Huy D Vu
*Assistant Examiner* — Dady Chery
(74) *Attorney, Agent, or Firm* — Hope Baldauff Hartman, LLC

(57) ABSTRACT

Systems and methods are disclosed for providing network testing. The disclosed systems and methods may include connecting to at least one element within a network. Furthermore, the disclosed systems and methods may include performing a test on the network through at least one element. The test may be associated with at least one addressable device connected to the network. In addition, the disclosed systems and methods may include analyzing data associated with the test.

17 Claims, 4 Drawing Sheets

| OSI MODEL | | |
|---|---|---|
| 7 | APPLICATION LAYER<br>TYPE OF COMMUNICATION:<br>E-MAIL, FILE TRANSFER, CLIENT/SERVER. | UPPER LAYERS |
| 6 | PRESENTATION LAYER<br>ENCRYPTION, DATA CONVERSION:<br>ASCN TO EBCDIC, BCD TO BINARY, ETC. | |
| 5 | SESSION LAYER<br>STARTS, STOPS SESSION.<br>MAINTAINS ORDER. | |
| 4 | TRANSPORT LAYER<br>ENSURES DELIVERY OF ENTIRE FILE OR<br>MESSAGE. | |
| 3 | NETWORK LAYER<br>ROUTES DATA TO DIFFERENT LANS AND WANS<br>BASED ON NETWORK ADDRESS. | LOWER LAYERS |
| 2 | DATA LINK (MAC) LAYER<br>TRANSMITS PACKETS FROM NODE TO NODE<br>BASED ON STATION ADDRESS. | |
| 1 | PHYSICAL LAYER<br>ELECTRICAL SIGNALS AND CABLING. | |

--PRIOR ART--

FIG. 4

METHODS AND SYSTEMS FOR PROVIDING END-TO-END TESTING OF AN IP-ENABLED NETWORK

RELATED APPLICATION

Under provisions of 35 U.S.C. §119 (e), the Applicants claim the benefit of U.S. provisional application No. 60/670,509, filed Apr. 12, 2005, entitled "METHODS AND SYSTEMS FOR PROVIDING AN END-TO-END TEST TOOL," which is incorporated herein by reference.

BACKGROUND OF THE INVENTION

I. Field of the Invention

The present invention generally relates to methods and systems for providing network testing. More particularly, the present invention relates to providing end-to-end testing of An IP-enabled network.

II. Background Information

Service providers wish to deploy internet protocol (IP) vertical services on a network. Vertical services may include, but are not limited to a Voice over IP, and IPTV, for example. In order to deploy IP vertical services, service providers need to effectively provision and troubleshoot network elements included in the network. For example, such a network may employ open system interconnection (OSI) standard for communications including upper layers and lower layers as illustrated in FIG. 4. Layers 7 through 4 comprise the upper layers and layers 3 through 1 comprise the lower layers.

OSI transport services include layers 1 through 4, and are collectively responsible for delivering a complete message or file from sending to receiving station without error. Layer 7 is the application layer. This top layer defines the language and syntax that programs use to communicate with other programs. The application layer represents the purpose of communicating. For example, a program in a client workstation uses commands to request data from a program in the server. Common functions at this layer are opening, closing, reading, and writing files, transferring files and e-mail messages, executing remote jobs, and obtaining directory information about network resources.

Layer 6 is the presentation layer. When data are transmitted between different types of computer systems, the presentation layer negotiates and manages the way data are represented and encoded. For example, it provides a common denominator between ASCII and EBCDIC machines as well as between different floating point and binary formats. This layer is also used for encryption and decryption.

Layer 5 is the session layer and provides coordination of the communications in an orderly manner. It determines one-way or two-way communications and manages the dialog between both parties, for example, making sure that the previous request has been fulfilled before the next one is sent. It also marks significant parts of the transmitted data with checkpoints to allow for fast recovery in the event of a connection failure. In practice, this layer is often not used or services within this layer are sometimes incorporated into the transport layer.

Layer 4 is the transport layer. This layer is responsible for overall end-to-end validity and integrity of the transmission. The lower layers may drop packets, but the transport layer performs a sequence check on the data and ensures that if, for example, a 12 MB file is sent, the full 12 MB is received.

Layers 3 through 1 are the lower layers and are responsible for moving packets from the sending station to the receiving station. Layer 3 is the network layer. The network layer establishes the route between the sender and receiver across switching points, which are typically routers. The most ubiquitous example of this layer is the IP protocol in TCP/IP. IPX, SNA, and AppleTalk are other examples of routable protocols, which means that they include a network address and a station address in their addressing system. This layer is also the switching function of the dial-up telephone system. If all stations are contained within a single network segment, then the routing capability in this layer is not required.

Layer 2 is the data link layer. The data link layer is responsible for node to node validity and integrity of the transmission. The transmitted bits are divided into frames, for example, an Ethernet, Token Ring, or FDDI frame in local area networks (LANs). Frame relay and ATM are also at Layer 2. Layers 1 and 2 are required for every type of communications.

Layer 1 is the physical layer. The physical layer is responsible for passing bits onto and receiving them from the connecting medium. This layer has no understanding of the meaning of the bits, but deals with the electrical and mechanical characteristics of the signals and signaling methods. For example, it comprises the RTS and CTS signals in an RS-232 environment, as well as TDM and FDM techniques for multiplexing data on a line. SONET also provides layer 1 capability.

In the context of the OSI model as described above, conventional systems include some testing capabilities at the layer 1 and layer 2 levels; however, there is no large-scale end-to-end network view. For example, conventional testing consists primarily of legacy narrowband troubleshooting tools, vendor specific diagnostics, and home grown testing solutions. In applying the conventional systems, service providers have learned to interpret and make best guess estimates with the conventional testing solutions. For example, a customer may call a customer service representative with the service provider and may say "I can't connect", "I can't reach this web address", "there's something the matter with my e-mail", or "there's something wrong with my phone which rides over my IP connection." Without an end-to-end test tool, the service provider may have difficulty isolating the problem. This may lead to not resolving the customer's problem on the first call or having hand-offs between different departments. This may further lead to customer dissatisfaction because the service provider may not be able to resolve the customer's problem on the first call because the service provider may not be able to accurately pinpoint the problem.

Furthermore, conventional systems increase the service provider's operating cost. For example, the service provider may send out equipment because they think the modem is bad, but in the end, the customer's equipment is defective. Or the service provider may dispatch a truck and technician, but then it turns out it is the wrong technician because the problem is in the customer's computer.

In order to be able to deploy IP vertical services, it is desired to be able to effectively provision and troubleshoot network elements that make up the end-to-end IP network using an end-to-end test tool. Looking forward with the expansion of broadband and complex broadband vertical services, service providers are faced with the reality that today's narrowband tools are inadequate to resolve tomorrow's troubles. For example, layer 1 and layer 2 testing will no longer suffice in resolving the customers' issues. True end-to-end broadband testing may be obtained and utilized to accurately troubleshoot not only basic broadband service, but all the planned services offered on top of broadband.

SUMMARY OF THE INVENTION

Consistent with embodiments of the present invention, systems and methods are disclosed for providing network testing.

In accordance with one embodiment, a method for providing network testing comprises connecting to at least one element within a network, performing a test on the network through the at least one element, the test associated with at least one addressable device connected to the network, and analyzing data associated with the test.

According to another embodiment, a system for providing network testing comprises a memory storage for maintaining a database and a processing unit coupled to the memory storage, wherein the processing unit is operative to connect to at least one element within a network, perform a test on the network through the at least one element, the test associated with at least one addressable device connected to the network, and analyze data associated with the test.

In accordance with yet another embodiment, a computer-readable medium which stores a set of instructions which when executed performs a method for providing network testing, the method executed by the set of instructions comprises connecting to at least one element within a network, performing a test on the network through the at least one element, the test associated with at least one addressable device connected to the network, and analyzing data associated with the test.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings:

FIG. 4 is a diagram showing layers that comprise the conventional OSI standard for communications.

DETAILED DESCRIPTION

Figure 1:
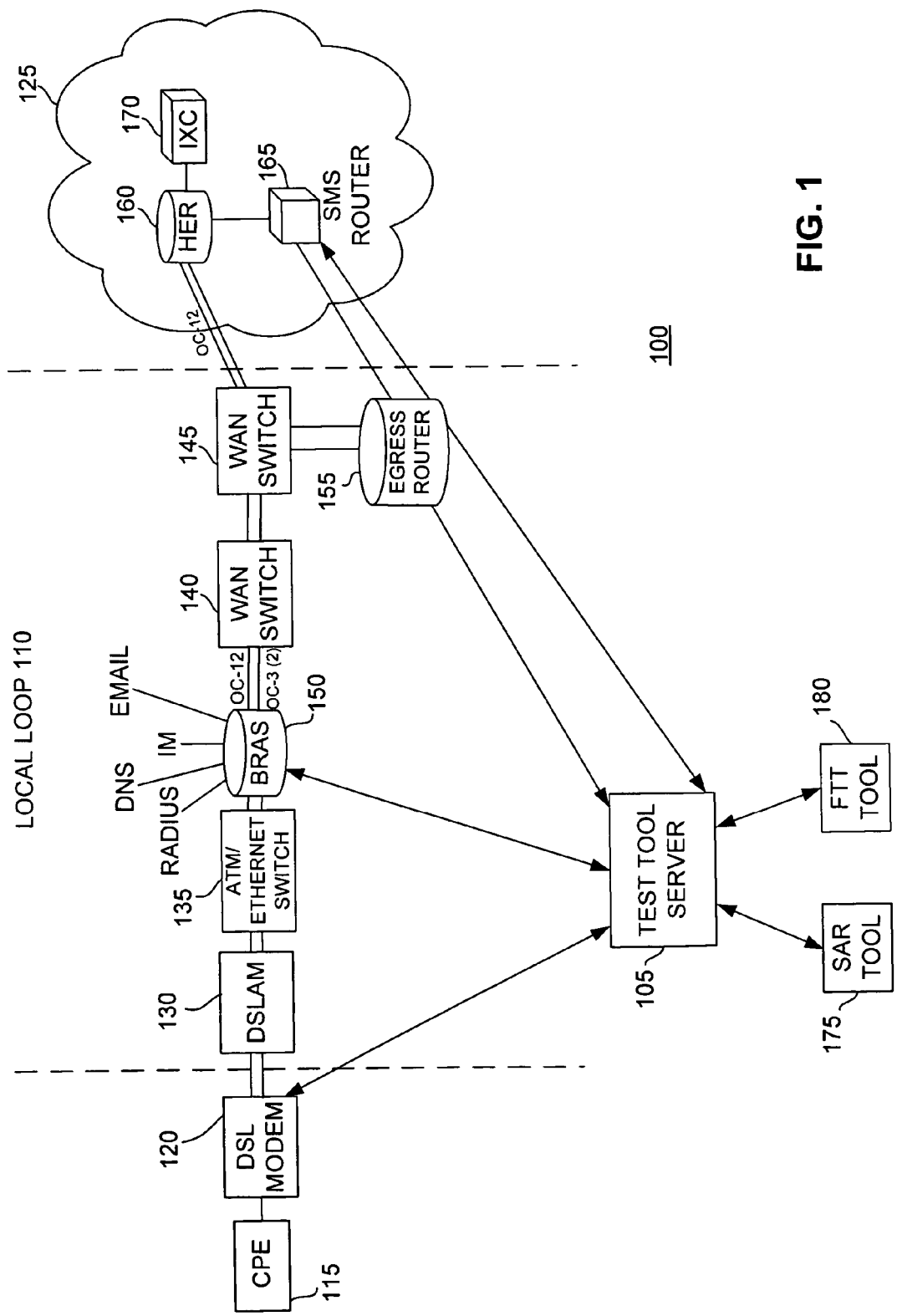
FIG. 1 is a block diagram of an exemplary end-to-end test system consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding stages to the disclosed methods. Accordingly, the following detailed description does not limit the invention. Instead, the proper scope of the invention is defined by the appended claims.

Systems and methods consistent with embodiments of the present invention provide network testing. Embodiments of the invention include providing trouble shooting a network from an end-to-end perspective. In other words, embodiments of the invention include trouble shooting the network including customer premises equipment at a customer's location, a local loop, and an IP network (e.g. the internet.) The customer premises equipment may comprise, for example, any device that may have an IP address. For example, the customer premises equipment comprises a personal computer (PC), a telephone, a set top game box, a digital video recorder. The customer premises equipment may connect to the local loop through a local area network (LAN), which may include a modem and/or a router. The local loop may include a digital subscriber line access multiplexer (DSLAM), a Broadband Remote Access Server (BRAS), or other types of equipment in the outside plant network.

Consistent with embodiments of the invention, the test tool emulates a customer experience with the network and is able to isolate and test trouble anywhere on the network. For example, embodiments of the invention allow the customer service representative to emulate the customer's equipment and look at the customer's IP traffic. This may be accomplished, for example, by remotely connecting into the BRAS or other network elements to conduct ping testing, continuity testing, trace routes, and other testing types. Furthermore, the test tool may test the customer's access to the e-mail server to confirm the trouble is not between, for example, the BRAS and the e-mail server.

In the context of the aforementioned OSI model, conventional systems include testing capabilities for the layer 1 and layer 2 levels, but do not include testing capabilities, at layer 3. Embodiments of the invention test at the layer 3 level, for example, by performing packet inspection on the network, for example, down to an individual customer level. This may include the ability to look at a packet's header information, for example, to determine where the packet is to go and why the packet is having problems getting to its destination.

An embodiment consistent with the invention comprises a system for providing network testing. The system comprises memory storage for maintaining a database and a processing unit coupled to the memory storage. The processing unit is operative to connect to at least one element within a network. In addition, the processing unit performs a test on the network through at least one element. The test is associated with at least one addressable device connected to the network. Also, the processing unit is operative to analyze data associated with the test.

Consistent with an embodiment of the present invention, the aforementioned memory, processing unit and other components are implemented in an end-to-end test system, such as an exemplary end-to-end test system 100 of FIG. 1. Any suitable combination of hardware, software, and/or firmware may be used to implement the memory, processing unit, or other components. By way of example, the memory, processing unit, or other components may be implemented within any element of FIG. 1 including, for example, a test tool server 105, in combination with system 100. The aforementioned system and processors are exemplary and other systems and processors may comprise the aforementioned memory, processing unit, or other components, consistent with embodiments of the present invention.

By way of a non-limiting example, FIG. 1 illustrates system 100 in which the features and principles of the present invention may be implemented. As illustrated in the block diagram of FIG. 1, system 100 includes the test tool server 105, a local loop 110, customer premises equipment (CPE) 115, a DSL modem 120, and an IP network 125. Local loop 110 includes a DSLAM 130, an asynchronous transfer mode (ATM) or Ethernet switch 135 (or some other type of layer 2 switch), wide area network (WAN) switches 140 and 145, an BRAS 150, and any egress router 155. IP network 125 is a customer-facing network that may include the internet. The internet may comprise a collection of interconnected public networks. A service provider's physical contribution to the public network includes but is not limited to a high-speed edge router (HER) 160, a service management system (SMS) router 165, and an interexchange carrier (IXC) 170. Access to the test tool server 105 may be provided both by a web services application programming interface (API) or via a provided expert graphical user interface (GUI) as part of the test tool. Both the API and the GUI may be integrated with other tools such as a service activation and repair (SAR) tool 175 and a FastAccess® Troubleshooting Tool (FTT) 180.

Figure 2:
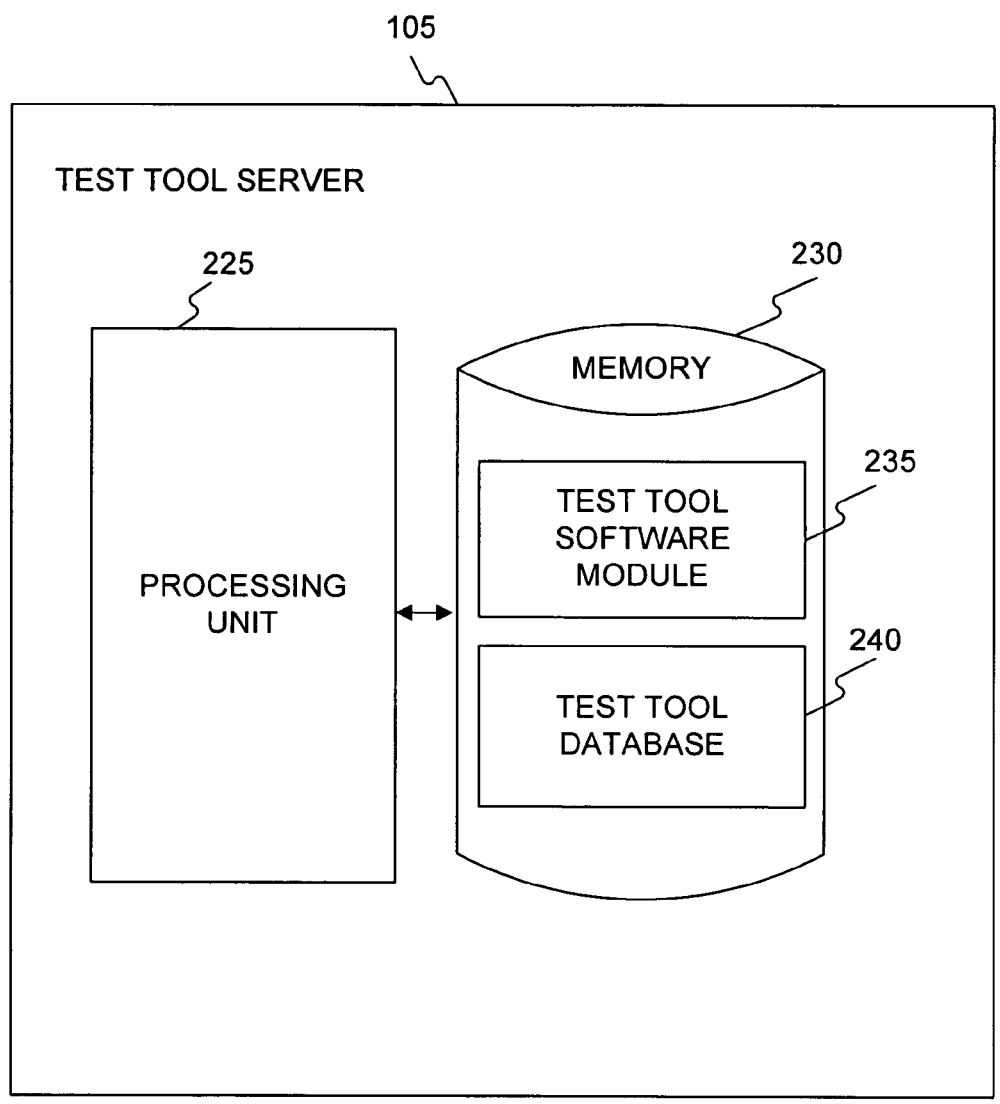
FIG. 2 is a block diagram of an exemplary test tool server consistent with an embodiment of the present invention.

FIG. 2 shows test tool server 105 of FIG. 1 in more detail. As shown in FIG. 2, test tool server 105 includes a processing unit 225 and a memory 230. Memory 230 includes a test tool software module 235 and a test tool database 240. While executing on processing unit 225, test tool software module 235 performs processes for providing network testing, including, for example, one or more of the stages of method 300 described below with respect to FIG. 3. Furthermore, any combination of software module 235 and database 240 may be executed on or reside in any one or more of the elements shown in FIG. 1.

Test tool server 105 ("the server") may be implemented using a high-availability cluster computing environment. Then, in addition to the computing environment, the test tool may include the following: using a personal computer, network computer, mainframe, or other similar microcomputer-based workstation. The overall computing environment may comprise any type of computer operating environment, such as hand-held devices, multiprocessor systems, microprocessor-based or programmable sender electronic devices, minicomputers, mainframe computers, and the like, in addition to the server. The server may also be practiced in distributed computing environments where tasks are performed by remote processing devices. Furthermore, the overall computing environment may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processor may comprise other systems or devices.

Figure 3:
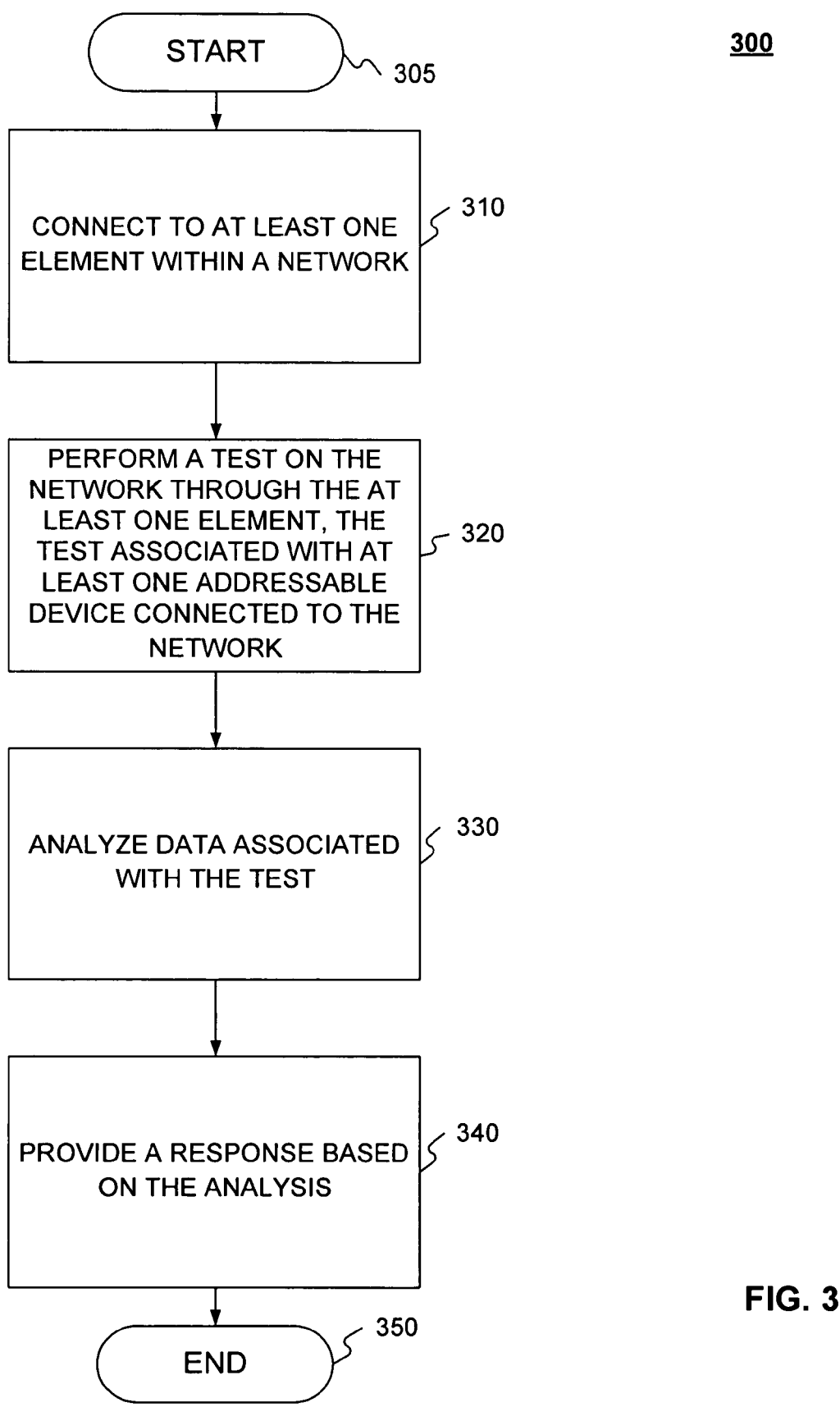
FIG. 3 is a flow chart of an exemplary method for providing network testing consistent with an embodiment of the present invention.

FIG. 3 is a flow chart setting forth the general stages involved in an exemplary method 300 consistent with the invention for providing network testing using system 100 of FIG. 1. Exemplary ways to implement the stages of exemplary method 300 will be described in greater detail below. Exemplary method 300 begins at starting block 305 and proceeds to stage 310 where test tool server 105 connects to at least one element within a network. For example, test tool server 105 connects to CPE 115 through DSL modem 120, to BRAS 150, to egress router 155, and to SMS router 165. The aforementioned are exemplary, and test tool server 105 may connect to other elements in system 100. In connecting to the network, "sniffers" may be employed by the test tool server 105. Sniffers may comprise devices that tap onto the network to perform passive or active testing.

From stage 310, where test tool server 105 connects to at least one element within the network, exemplary method 300 advances to stage 320 where test tool server 105 performs a test on the network through at least one element. The test may be associated with at least one addressable device (e.g. CPE 115) connected to the network. For example, the test may be performed by executing software module 235 on processing unit 225. During execution, software module 235 may perform a variety of network testing functions. A plurality of exemplary network testing functions are described below; however, other functions may be performed by software module 235.

A first network testing function comprises the ability to log/monitor traffic on the network and have it sent, for example, to support groups. This function enables a remote logging capability that may capture, for example, the following information: ATM cell traffic counters, OAM traffic, IP traffic, HEC errors, CRC errors, retransmits, PPP/PPPOE session identification, detailed LCP/NCP negotiation, detailed authentication logging CHAP/PAP. This function also provides the ability to retrieve line stats including sync rates, noise margins, bits per tone, and sync retrains. Furthermore, it provides the ability to look at two-way traffic to determine, for example, packets transmitted and received and display to a customer service representative. Moreover, it provides a view of the network traffic (e.g. gaming, VoIP, file sharing, telnet, etc.) going both ways, port traffic open, or no encryptions.

A second network testing function comprises the ability to setup thresholds and alarms for proactive support. This function provides the ability to track port utilization for known abused ports (e.g. UDP and TCP) and to receive an alarm or notification from the test tool when thresholds reach a user-definable level by, for example, network element, lata, and region. This function provides the ability to acknowledge and log the alarm receipt from the test tool and the ability to specify certain user admin privileges (i.e., certain users may not be able to clear the alarms, would be view-only, etc.) In addition, this function maintains a historical record of alarms/notifications sent in a specified rolling time period (e.g. 24 hours.) It also provides the ability to retrieve historical data of alarms/notifications that have been sent, for example, in past 90 days, store historical data of alarms/notifications that have been sent for 90 days, and super-users may have the ability to establish/maintain abused port list based on industry trends (e.g. port #, UDP/TCP toggle, virus/worm/Trojan/etc. name). This function also provides the ability to detect and log viruses, provides the ability to detect and log spyware activity, and provides the ability to configure detection of new threats and removal of old threats.

A third network testing function comprises the ability to perform trace route and ping tool information from, for example, service provider-owned looking glass in the core of the network to CPE, Voice over IP call complex, DNS and Radius servers, and email servers. This function provides the ability to remotely perform a trace route to the CPE from the looking glass, provides the ability to display a trace route from the CPE (provided via CPEMS), or provides the ability to perform a ping to the CPE from the looking glass. Furthermore, it provides the ability to display the results of a ping test from the CPE (provided via CPEMS) and may provide the ability to access the BRAS, future BRAS or IP DSLAMS and source the customer's IP pool interface, and ping/trace the Radius, DNS, IM, and email servers and ping/trace to a web site. If a ping/trace run above fails, this function may send a trap to the Network Operations Center on any failure, specifying the IP pool and device.

A fourth network testing function comprises the ability to provide network authentication general information. For example, this function provides the ability to display authentication server (Radius, BRAS etc.) and to reject errors (example, bad password, invalid username, etc.)

A fifth network testing function comprises the ability to conduct point to point connectivity tests from the network core to the CPE. For example, this function provides performance testing of TCP/IP sessions. In addition it provides the ability to validate ATM layer connectivity via a layer 2 test tool and provides the ability to test the physical layer via a layer 1 test tool.

A sixth network testing function comprises optimizing via PSD for sync and throughput. For example, this function provides the ability to remotely set the "PSD shaping" setting of the CPE to on/off/auto. The PSD shaping is used to adjust the upstream power so that reflections from inside wiring don't adversely interfere with the received signal. When these reflections are bad, this lower power usage on the upstream signal can achieve a better downstream sync rate.

A seventh network testing function categorizes line parameters for upgrade service qualification. For example, this function provides the ability to gather line parameters including, for example, noise margin, attenuation, max sync rate capacity (NOT throughput). Max sync rate capacity may only be displayed to users with appropriate permissions. Also, this function has the ability to provide DSLAM port-level qualifications of ADSL2+, bonding, and ADL1 (i.e., is the port provisioned for this service able to support ADSL2+, Bonding, ADL1, etc.)

An eighth network testing function comprises the ability to turn on maintenance profile. For example, this function provides the ability to remotely push a new maintenance profile to the CPE.

A ninth network testing function comprises, for example, remote PPP session generation with the capability to generate at various network points. For example, this function provides the ability to generate the PPP/PPPoE session at the BRAS, the DSLAM network cards, or the Edge devices.

A tenth network testing function comprises the remotely detecting CPE 155. For example, this function has the ability to remotely detect the CPE status and the ability to identify the CPE type.

An eleventh network testing function comprises a deep packet inspection or packet mirroring capability at BRAS with packet decoder. This function, for example, provides the ability to remotely sniff and decode packets in the end-to-end IP path of the broadband traffic. In addition, it provides the ability to capture data for a period of time and to log for the specified time period. In addition, it provides the ability to sort customer traffic by protocol and packet size.

A twelfth network testing function comprises the ability to create a network map and to determine connectivity per subscriber listing at BRAS, other IP devices, AAA/Radius, DNS, email, etc. and to include real time stats for each hop and utilization of the facilities. In addition, it provides the ability to generate a network map for an individual subscriber that may include the following: DSLAM, ATM, edge routers, core routers, IP devices, radius, DNS. In addition, it provides the ability to pull real time stats for each hop and provides the ability to display utilization for each device shown on the network map.

A thirteenth network testing function comprises retrieving traffic counters on a per subscriber level. This function provides the ability to retrieve individual subscriber traffic counts from each device or hop and to provide the ability to pull IP layer stats at each network element.

A fourteenth network testing function comprises an auto test when multiple subscribers exhibit the same issues. For example, when multiple subscribers exhibit the same issues on a given network element within a time period (e.g. user definable), an auto test is executed against all subscribers in that network element and provides alarm/notification to a monitoring group.

A fifteenth network testing function detects capacity, device, and general congestion issues and reports at which segment the congestion is occurring. This function provides the ability to log performance monitoring stats at the ATM. In addition, it provides the ability to log performance monitoring stats at the IP layer and provides the ability to log performance monitoring stats at the physical layer.

A sixteenth network testing function comprises the ability to differentiate access levels for different users (user classes). In addition, it provides the ability to designate different user classes (ex. Admin, read-only, etc.)

A seventeenth network testing function comprises the test tool being accessible via other applications. For example, data may be stored and made accessible via an API such that existing customer facing applications (ex. FTT, eRepair, SAR) can initiate tests, retrieve the data, and present to user.

An eighteenth network testing function comprises the system response time being within acceptable levels. For example, historical queries have <7 seconds response time and response time for information retrieved from the tool via an API may be <=3 seconds.

A nineteenth network testing function comprises providing "deep packet inspection" of IP and up (e.g. layer 3 to 7). The function determines what protocols are running (peer to peer, http, von, video, etc), ports, and aggregate volumes of each. In addition, it provides the ability to see individual flow of traffic (e.g. could be many per subscriber). In addition, it provides the ability to determine application (e.g. if voice protocol seen, is it Vonage?)

Once test tool server 105 performs the test on the network through at least one element in stage 320, exemplary method 300 continues to stage 330 where test tool server 105 analyzes data associated with the test. For example, based on the test performed, test tool server 105 may determine that a new modem should be sent to the customer or to dispatch a service technician. Furthermore, if the test tool server 105 detected, for example, that DSLAM 130 or that BRAS 150 are down, test tool server 105 may determine that personal at a network operating center (NOC) should be involved in clearing any problem the customer may have.

After test tool server 105 analyzes data associated with the test in stage 330, exemplary method 300 proceeds to stage 340 where test tool server 105 provides a response based on the analysis. For example, based on the analysis, test tool server 105 may provide a response to a customer service representative that a new modem should be sent to the customer, that a service technician should be dispatched, or that the NOC should be involved in clearing any problem the customer may have.

Moreover, test tool server 105 may display reports on computer monitor with ability to save in standard format (ex. MS Word, Excel) and print locally. One such report comprises an ad hoc report that may provide the ability to perform report generation capabilities providing the user the ability to derive customized reports from logs. Also, the report may comprise an agent activity report that displays agent activity by test/transaction/functionality. Table 1 shows an exemplary output for the agent activity report.

TABLE 1

Customer Status Report

| Customer Service Type (Business/ Residential, Dial or DSL, etc.) | Speed/ max sync rate | Tele Num | Thruput (bytes or kb) | Application Type |
|---|---|---|---|---|
| Day of Week | | | | |
| Time of Day | | | | |
| City/State | | | | |

Furthermore, the report may comprise an uptime-by-customer report that comprises a canned report should provide display of uptime by customer derived from logged data. Also, the report may comprise a tests-run-by-center/location report that provides a report that displays the tests run by a given center/location. After test tool server 105 provides the response based on the analysis in stage 340, exemplary method 300 ends at stage 350.

Table 2 below comprises a glossary of many terms used above.

TABLE 2

| Term | Description |
|---|---|
| List the name of the term. | List the definition of the term. |
| API | Application Programming Interface |
| ATM | Asynchronous Transfer Mode |
| BRAS | Broadband Remote Access Server |
| CPE | Customer Premises Equipment |
| CPEMS | Customer Provided Equipment Management System |
| CRC | Cyclic Redundancy Check |
| CVON | Consumer Voice over Network |
| DSL | Digital Subscriber Line |
| DSLAM | Digital Subscriber Line Access Multiplexer |
| FTT | FastAccess ® Troubleshooting Tool |
| HEC | Header Error Check |
| HER | High-Speed Edge Router |
| IP | Internet Protocol |
| IPTV | Internet Protocol Television |
| IXC | Interexchange Carrier |
| LAN | Local Area Network |
| LCP | Link Control Protocol |
| NCP | Network Control Protocol |
| NOC | Network Operations Center |
| OAM | Operations, Administration, and Maintenance |
| PC | Personal Computer |
| PPP | Point-to-Point Protocol |
| PPPOE | Point-to-Point Protocol over Ethernet |
| PSD | Power Spectrum Density |
| SAR | Service Activation and Repair |
| TCP | Transmission Control Protocol |
| TCP/IP | Transmission Control Protocol/Internet Protocol |
| UDP | User Datagram Protocol |
| VoIP | Voice over IP |
| VON | Voice Over Network |
| WAN | Wide Area Network |

Furthermore, the invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general purpose computer or in any other circuits or systems.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable storage medium may be any medium that can contain or store the program for use by or in connection with the instruction execution system, apparatus, or device.

The computer-usable or computer-readable storage medium may be, for example, but not limited to, an electronic, magnetic, optical, electromagnetic, infrared or semiconductor system, apparatus, or device. More specific examples (a nonexhaustive list) of the computer-readable storage medium would include the following: a portable computer diskette, a random access memory (RAM), a read-only memory (ROM), an erasable programmable read-only memory (EPROM or Flash memory), and a portable compact disk read-only memory (CD-ROM).

The present invention is described above with reference to block diagrams and/or operational illustrations of methods, systems, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable storage media, such as secondary storage devices, like hard disks, floppy disks, or a CD-ROM, or other forms of RAM or ROM. Further, the steps of the disclosed methods may be modified in any manner, including by reordering steps and/or inserting or deleting steps without departing from the principles of the invention.

It is intended, therefore, that the specification and examples be considered as exemplary only, with a true scope and spirit of the invention being indicated by the following claims and their full scope of equivalents.

What is claimed is:

1. A method for providing network testing, the method comprising:

connecting, at a server, to at least one element within a network;

performing, by the server, a test on at least one layer of the network through the at least one element, the at least one layer selected from a group comprising an open system interconnection layer 3, an open system interconnection layer 4, an open system interconnection layer 5, an open system interconnection layer 6, and an open system interconnection layer 7, the test associated with at least one addressable device connected to the network, and wherein performing the test comprises inspecting packet header information of packets associated with an individual customer, inspecting the packets for observing an individual flow of traffic, determining which application is being used by the individual customer based on the packets inspected, monitoring traffic on the network comprising capturing asynchronous transfer mode cell traffic counters, operations, administration, and maintenance traffic, internet protocol traffic, header error check errors, and cyclic redundancy check errors, sending the traffic monitored to a support group, setting up thresholds for proactive support, wherein setting up the thresholds for the proactive support comprises tracking port utilization of known abused ports and receiving a notification when the thresholds reach a user-definable level, and retrieving traffic counters associated with the individual customer at each network element on the network;

analyzing data associated with the test, wherein analyzing the data associated with the test to determine whether at least one of a new device should be sent, a service technician should be dispatched, or personnel at a network operating center should be involved; and upon determining whether at least one of a new device should be sent, a service technician should be dispatched, or personnel at a network operating center should be involved, providing a response based on the data analysis, wherein providing the response comprises at least one of sending the new device, dispatching the service technician, or involving the personnel at the network operating center.

2. The method of claim 1, wherein connecting to the at least one element within the network further comprises connecting to the at least one element selected from the group comprising a digital subscriber line modem, a digital subscriber line access multiplexer, an asynchronous transfer mode, a broadband remote access server, a wide area network, an egress router, and a short message service router.

3. The method of claim 1, wherein performing the test further comprises performing the test configured to emulate a customer's experience with the network.

4. The method of claim 1, wherein performing the test further comprises performing the test configured to inspect packets associated with the individual customer and to adjust upstream power to reduce interference with a received signal.

5. The method of claim 1, wherein performing the test on the network through the at least one element, the test associated with at least one addressable device connected to the network further comprises the addressable device having an internet protocol address.

6. A server for providing network testing, the server comprising:

a memory storage for maintaining a database; and a processing unit coupled to the memory storage, wherein the processing unit is operative to:

connect to at least one element within a network;

perform a test on at least one layer of the network through the at least one element, the at least one layer selected from a group comprising an open system interconnection layer 3, an open system interconnection layer 4, an open system interconnection layer 5, an open system interconnection layer 6, and an open system interconnection layer 7, the test associated with at least one addressable device connected to the network, and the test configured to inspect packet header information of packets associated with an individual customer, to inspect the packets for observing an individual flow of traffic, to determine which application is being used by the individual customer based on the packets inspected, to monitor traffic on the network comprising capturing asynchronous transfer mode cell traffic counters, operations, administration, and maintenance traffic, internet protocol traffic, header error check errors, and cyclic redundancy check errors, to send the traffic monitored to a support group, to set up thresholds for proactive support, wherein setting up the thresholds for the proactive support comprises tracking port utilization of known abused ports and receiving a notification when the thresholds reach a user-definable level, and to retrieve traffic counters associated with the individual customer at each network element on the network;

analyze data associated with the test to determine whether at least one of a new device should be sent, a service technician should be dispatched, or personnel at a network operating center should be involved; and upon determining whether at least one of a new device should be sent, a service technician should be dispatched, or personnel at a network operating center should be involved, provide a response based on the data analysis, wherein providing the response comprises at least one of sending the new device, dispatching the service technician or involving the personnel at the network operating center.

7. The server of claim 6, wherein the processing unit being operative to connect to the at least one element within the network further comprises the processing unit being operative to connect to the at least one element selected from the group comprising a digital subscriber line modem, a digital subscriber line access multiplexer, an asynchronous transfer mode, a broadband remote access server, a wide area network, an egress router, and a short message service router.

8. The server of claim 6, wherein the processing unit being operative to perform the test further comprises performing the test configured to emulate a customer's experience with the network.

9. The server of claim 6, wherein the processing unit being operative to perform the test further comprises the processing unit being operative to perform the test configured to inspect packets associated with the individual customer and to adjust upstream power to reduce interference with a received signal.

10. The server of claim 6, wherein the processing unit being operative to perform the test on the network through at least one element, the test associated with at least one addressable device connected to the network further comprises the addressable device having an internet protocol address.

11. The server of claim 6, wherein the test is further configured to:

remotely identify a type of the at least one addressable device; and remotely detect a status of the at least one addressable device.

12. A non-transitory computer-readable storage medium having computer-executable instructions stored thereon which, when executed by a computer, cause the computer at least to:

connect to at least one element within a network;

perform a test on an open system interconnection layer 3, an open system interconnection layer 4, an open system interconnection layer 5, an open system interconnection layer 6, and an open system interconnection layer 7 of the network through the at least one element, the test associated with at least one addressable device connected to the network, and wherein performing the test comprises inspecting packet header information of packets associated with an individual customer, inspecting the packets for observing an individual flow of traffic, determining which application is being used by the individual customer based on the packets inspected, generating remote point-to-point sessions at multiple network points, monitoring traffic on the network comprising capturing asynchronous transfer mode cell traffic counters, operations, administration, and maintenance traffic, internet protocol traffic, header error check errors, and cyclic redundancy check errors, sending the traffic monitored to a support group, setting up thresholds for proactive support, wherein setting up the thresholds for the proactive support comprises tracking port utilization of known abused ports and receiving a notification when thresholds reach a user-definable level, and retrieving traffic counters associated with the individual customer at each network element on the network;

analyze data associated with the test, wherein analyzing the data associated with the test comprises determining whether at least one of a new device should be sent, a service technician should be dispatched, or personnel at a network operating center should be involved; and upon determining whether at least one of a new device should be sent, a service technician should be dispatched, or personnel at a network operating center should be involved, provide a response based on the data analysis, wherein providing the response comprises at least one of sending the new device, dispatching the service technician or involving the personnel at the network operating center.

13. The non-transitory computer-readable storage medium of claim 12, wherein connecting to the at least one element within the network further comprises connecting to the at least one element selected from the group comprising a digital subscriber line modem, a digital subscriber line access multiplexer, an asynchronous transfer mode, a broadband remote access server, a wide area network, an egress router, and a short message service router.

14. The non-transitory computer-readable storage medium of claim 12, wherein performing the test further comprises performing the test configured to emulate a customer's experience with the network.

15. The non-transitory computer-readable storage medium of claim 12, wherein performing the test further comprises performing the test configured to inspect packets associated with the individual customer and to adjust upstream power to reduce interference with a received signal.

16. The method of claim 1, wherein performing, by the server, the test further comprises remotely identifying a type of the at least one addressable device and detecting a status of the at least one addressable device.

17. The non-transitory computer-readable medium of claim 12, wherein performing the test further comprises remotely identifying a type of the at least one addressable device and detecting a status of the at least one addressable device.

* * * * *